US012750369B1

(12) United States Patent
Parker

(10) Patent No.: US 12,750,369 B1
(45) Date of Patent: Sep. 29, 2026

(54) ZERO-SHOT AI WORKFLOW ENGINE

(71) Applicant: The Dot Net Factory, LLC., Dublin, OH (US)

(72) Inventor: Patrick Henry Parker, Sarasota, FL (US)

(73) Assignee: THE DOT NET FACTORY, LLC., Dublin, OH (US)

( * ) Notice: Subject to any disclaimer, the term of this patent is extended or adjusted under 35 U.S.C. 154(b) by 0 days.

(21) Appl. No.: 19/410,871

(22) Filed: Dec. 5, 2025

Related U.S. Application Data

(60) Provisional application No. 63/798,682, filed on May 2, 2025.

(51) Int. Cl.
*H04L 9/40* (2022.01)
*G06N 3/096* (2023.01)

(52) U.S. Cl.
CPC ............. *H04L 63/10* (2013.01); *G06N 3/096* (2023.01)

(58) Field of Classification Search
CPC .................................. H04L 63/10; H04L 9/40
USPC .......................................................... 718/102
See application file for complete search history.

(56) References Cited

U.S. PATENT DOCUMENTS 8,375,427 B2 2/2013 Alavandar et al.
8,392,973 B2 3/2013 Bank et al.
10,367,834 B2 7/2019 Sweet et al.
11,303,659 B2 4/2022 Yu et al.
11,379,225 B1 * 7/2022 Velusamy ................. G06F 8/73
11,461,677 B2 10/2022 Badawy et al.
11,886,585 B1 1/2024 Davis
12,519,840 B1 * 1/2026 Abotchie ................ H04L 63/20
2017/0295181 A1 * 10/2017 Parimi .................. H04L 67/535
2018/0143854 A1 5/2018 Kumar et al.
2020/0143263 A1 5/2020 Morin
(Continued)

FOREIGN PATENT DOCUMENTS

DE 202025100771 U1 3/2025

OTHER PUBLICATIONS

Application and drawings as filed on Dec. 12, 2025, in U.S. Appl. No. 19/410,918, 63 pages.
(Continued)

*Primary Examiner* — Pierre Vital
*Assistant Examiner* — Jordan Scott Motter
(74) *Attorney, Agent, or Firm* — Vorys, Sater, Seymour and Pease, LLP; Michael Messinger

(57) ABSTRACT

An agent-centric workflow system includes a workflow engine operable to receive a workflow identifier and return a machine-readable response including instructions and success criteria for use by an AI agent. The workflow engine can include a next path generator operable to identify a possible next step in an identified workflow, dependencies between nodes of the identified workflow, and a consequence of the possible next step using a configuration file that corresponds to an API for the identified workflow, as well as an agent context manager operable to use the configuration file to construct the machine-readable response. The system can further include a large language model (LLM) agent operable to receive the machine-readable response and execute the instructions in a zero-shot execution. The system can include a target system including one or more APIs through which the LLM agent communicates with an identity provider or policy decision point.

20 Claims, 9 Drawing Sheets

(56) References Cited

U.S. PATENT DOCUMENTS

| | | | | |
|---|---|---|---|---|
| 2021/0209008 | A1 | 7/2021 | Huang et al. | |
| 2022/0058278 | A1 | 2/2022 | Hirson et al. | |
| 2022/0200998 | A1 | 6/2022 | Sudhakaran et al. | |
| 2022/0292067 | A1* | 9/2022 | Zhang | G06F 16/2282 |
| 2023/0325725 | A1 | 10/2023 | Lester et al. | |
| 2024/0046330 | A1 | 2/2024 | Fan et al. | |
| 2024/0403772 | A1* | 12/2024 | Lafreniere | G06F 3/011 |
| 2025/0077238 | A1* | 3/2025 | Obando Chacon | G06F 40/284 |
| 2025/0094140 | A1 | 3/2025 | Rajendran et al. | |
| 2025/0094820 | A1 | 3/2025 | Paul et al. | |
| 2025/0110806 | A1* | 4/2025 | Kurka | G06F 9/4881 |
| 2025/0138912 | A1 | 5/2025 | Tricot et al. | |
| 2025/0321722 | A1* | 10/2025 | Nadarajah | G06F 8/34 |
| 2025/0322244 | A1* | 10/2025 | Mysore | G06F 11/3684 |
| 2025/0322328 | A1* | 10/2025 | Agarwal | G06F 40/30 |
| 2026/0038084 | A1 | 2/2026 | Kuckreja et al. | |
| 2026/0086728 | A1* | 3/2026 | Pavlovic | G06F 3/0647 |

OTHER PUBLICATIONS

Non-Final Office Action dated Apr. 9, 2026, issued in U.S. Appl. No. 19/410,918, 24 pages.

Written Opinion and International Search Report issued in corresponding PCT Application No. PCT/US2026/026216, dated Jul. 10, 2026, 16 pages.

Final Office Action mailed Jun. 11, 2026, in U.S. Appl. No. 19/410,918 (14 pages).

* cited by examiner

600

```
connector:
  name: "ServiceNow"                                          602
  version: "2.0"
  ai_metadata:                                                604
    description: "ServiceNow ITSM integration"
    capabilities: ["incident", "user", "group"]
    required_context: ["tenant", "scope"]
  operations:                                                 606
    create_incident:                                          608
      endpoint: "/api/incident"
      method: "POST"
      auth_requirements:
        - scope: "incident.write"
      transforms:
        request:
          mapping: { /* ... */ }
```

FIG. 6

700

```
{                                                             702
  "workflow_context": {
    "name": "create_user_account",
    "current_node": "validate_request",
    "state": "awaiting_input"
  },                                                          704
  "ai_execution_context": {
    "instructions": "Validate the new user request against compliance policies",
    "required_checks": ["name_format", "email_domain", "role_permissions"],
    "success_criteria": ["all_validations_passed", "decision_documented"],
    "constraints": ["no_privileged_roles", "standard_domains_only"],
    "examples": {
      "valid_response": {
        "decision": "approve",
        "validation_results": { /* ... */ }
      }
    }
  },                                                          706
  "next_steps": {
    "preview": "On approval, proceed to account creation",
    "required_permissions": ["user.create"]
  }
}
```

FIG. 7

ZERO-SHOT AI WORKFLOW ENGINE

CROSS-REFERENCE TO RELATED APPLICATIONS

This application claims priority to and the benefit of the provisional patent application titled "ZERO-SHOT AI WORKFLOW ENGINE", application No. 63/798,682, filed in the United States Patent and Trademark Office on May 2, 2025. The specification of the above-referenced patent application is incorporated herein by reference in its entirety.

TECHNICAL FIELD OF THE DISCLOSURE

The present disclosure relates generally to AI-based workflow execution for enterprise systems.

BACKGROUND OF THE DISCLOSURE

For enterprise systems that include various access credentials for roles spanning from IT managers to temporary contractors, identity management solutions have become a cornerstone for ensuring secure and efficient access to these systems and services. These identity management solutions are utilized to manage user identities, authenticate access, and enforce security policies across one or more platforms. However, the integration of identity management systems with other enterprise applications can present numerous challenges, particularly due to the varying syntaxes of application programming interfaces (APIs) and the specialized requirements of prompt engineering in AI-based workflows.

APIs often serve as the primary means for different software systems to communicate and interact. Despite widespread use, the majority of APIs often lack standardization, such that a multitude of syntaxes and protocols are employed across the varying interfaces. The lack of uniform standards can lead to increased complexity and inefficiency when integrating identity management solutions with other applications. To bridge the gaps between identity management systems and each new API, developers are tasked with writing extensive custom codes, which can be time-consuming and prone to errors.

Further, the increased adoption of artificial intelligence (AI) in identity management solutions has introduced further complications and considerations related to workflow automation and optimization. AI-based add-ons can be designed to enhance productivity by automating routine tasks, providing informed insights, and facilitating decision-making processes. However, the effectiveness of these AI-based solutions can be dependent on prompt engineering, or the process of designing and refining the inputs, or prompts, that guide the AI's responses. Specialized prompt engineering can be essential to ensure that AI systems deliver accurate and relevant outputs for AI-based solutions, but can introduce another layer of complexity to the integration process as each new API-integration can require a new specialized prompt or further training.

As such, the integration of AI-based solutions with an increasing number of specialized API protocols can be time-consuming, computationally-expensive, and can prevent the rapid adoption of AI-based solutions for identity management solutions.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an aspect of the present disclosure, an agent-centric workflow system includes a workflow engine operable to receive a workflow identifier and return a machine-readable response including instructions and success criteria for use by an AI agent. The workflow engine can include a next path generator operable to identify a possible next step in an identified workflow, dependencies between nodes of the identified workflow, and a consequence of the possible next step using a configuration file that corresponds to an API for the identified workflow, as well as an agent context manager operable to use the configuration file to provide a current state, instructions, constraints, and success criteria corresponding to the possible next step and operable to construct the machine-readable response. The system can further include a large language model (LLM) agent, including a natural language processor, and operable to receive the machine-readable response and execute the instructions under the constraints in a zero-shot execution. The system can include, or be communicatively coupled to, a target system including one or more API interfaces through which the LLM agent communicates with an identity provider or policy decision point.

In another aspect, a computer-implemented method for performing a workflow in an agent-centric paradigm includes receiving a workflow identifier within a workflow engine to initiate an operation of a large language model (LLM) agent. The method can further include generating instructions, constraints, and success criteria for execution by the LLM agent for a next possible step of an identified workflow corresponding to the workflow identifier, and executing, via the LLM agent, the instructions under the constraints for the next possible step through a universal authorization layer, the universal authorization layer performing normalization of access requests and enforcing identity policies. The method can continue with assessing, via the LLM agent, whether the success criteria have been met for the next possible step of the identified workflow, and querying the workflow engine for a further possible step for the identified workflow based upon the success criteria and an assessed result thereof.

In a further aspect, a vendor-agnostic identity integration system includes a large language model (LLM) agent, including a natural language processor, and operable to execute instructions for a specified workflow. The system further includes a connector construction engine operable to receive and parse documentation for an API of the specified workflow to construct a corresponding configuration file, and a workflow engine, implemented on at least one processor, operable to receive a workflow identifier corresponding to the specified workflow and return a machine-readable response constructed from the corresponding configuration file, the machine-readable response including instructions and success criteria for execution by the LLM agent. The system can further include a universal authorization layer operable to normalize access requests and enforce policies across a plurality of identity providers and policy decision points, a target system including one or more APIs through which the LLM agent communicates with an identity provider or policy decision point via the universal authorization layer, and a logging engine operable to record operations of the LLM agent and workflow states of the specified workflow in a standardized audit format.

Any combinations of the various embodiments and implementations disclosed herein can be used in a further embodiment, consistent with the disclosure. These and other embodiments and features can be appreciated from the following description of certain embodiments presented herein in accordance with the disclosure and the accompanying drawings and claims.

BRIEF DESCRIPTION OF THE DRAWINGS

FIG. 6 is a sample connector for an example of API-specific YAML configuration file, according to one or more embodiments of the present disclosure.

FIG. 7 is a sample machine-readable response to be used by an LLM agent in executing an identified workflow, according to one or more embodiments of the present disclosure.

DETAILED DESCRIPTION

Figure 1:
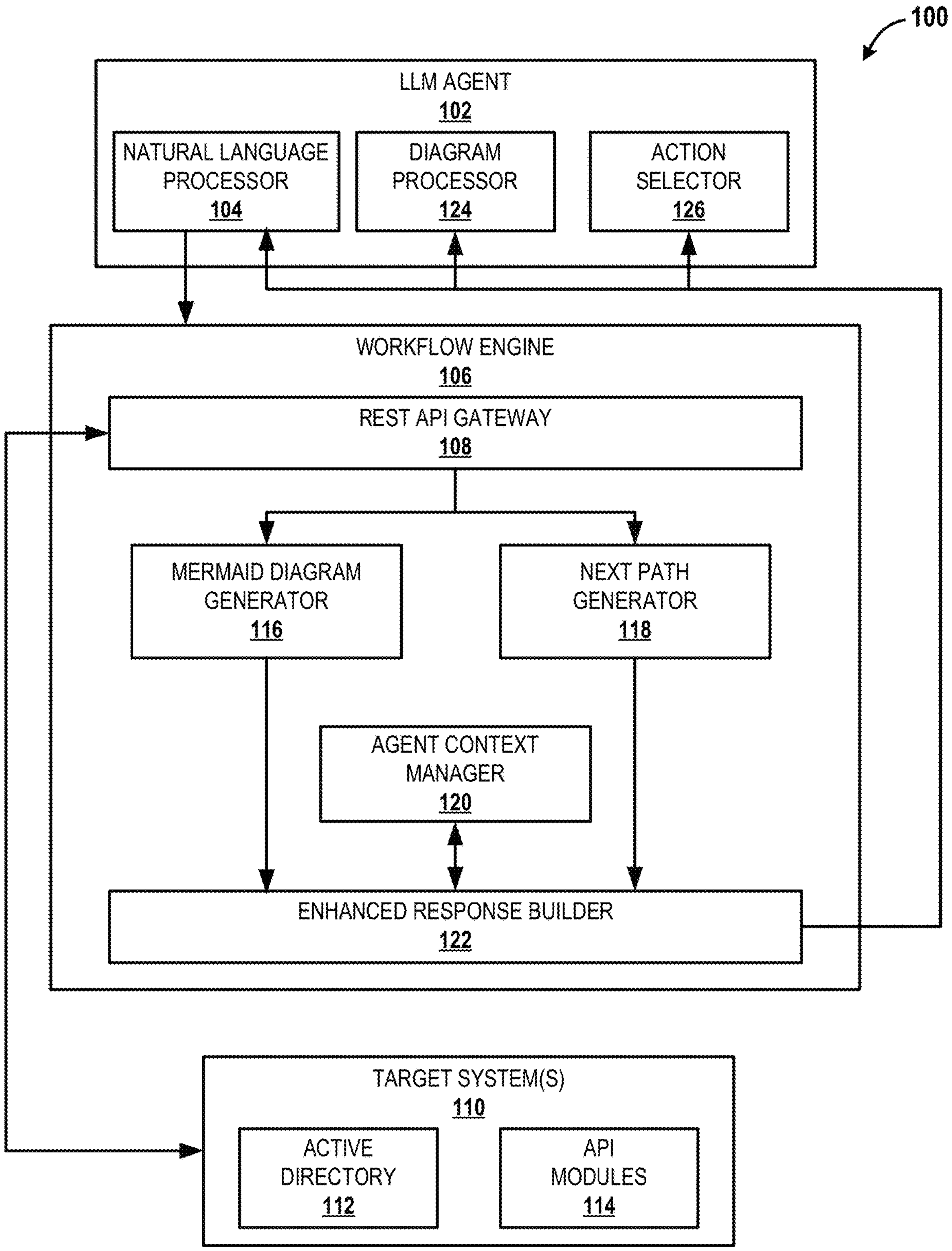
FIG. 1 is an example system for enabling agentic consumption of workflows for identity management systems with a zero-shot approach, according to one or more embodiments of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to workflow execution for enterprise systems and, more particularly, to utilizing a zero-shot AI workflow engine with LLM agents through a universal API gateway for autonomous execution of identity management system services. The disclosed systems and methods can provide an agent-centric workflow system designed to streamline the integration and execution of workflows across diverse identity management solutions while using an AI-based workflow. The system can include a workflow engine that receives a workflow identifier and returns a machine-readable response containing instructions and success criteria for execution by an AI agent. This workflow engine can further include a next path generator, which identifies possible next steps in the workflow, dependencies between workflow nodes, and the consequences of these steps. In some embodiments, the workflow engine can employ a configuration file corresponding to an API for the identified workflow, the configuration file detailing each of the instructions, success criteria, next steps, dependencies, and consequences in a YAML-based structure. Additionally, an agent context manager can utilize the configuration file to provide the current state, instructions, constraints, and success criteria for the next step, and can thus construct the machine-readable response accordingly. While the configuration files can be typically generated in a YAML format, the machine-readable responses can be provided in JSON format, which can include instructions, intermediate checks, constraints, success criteria, and examples for the LLM agent to utilize.

In the disclosed methods and systems, a large language model (LLM) agent, equipped with a natural language processor, can receive the machine-readable response and execute the instructions under the specified constraints in a zero-shot execution. Unlike traditional AI-based workflow add-ons, which can require extensive prompting and specialized training, the zero-shot execution of the disclosed systems and embodiments can enable the LLM agent to execute the workflow without any prior training. The disclosed system can further include a database that stores a plurality of configuration files for various workflows, APIs, and identity providers. A connector construction engine can be included, and operable to parse documentation for APIs that lack corresponding configuration files in the database, and can thereby construct new configuration files with the necessary instructions, constraints, and success criteria for the associated workflows.

The LLM agent of the disclosed systems and methods can communicate with an identity provider or policy decision point through one or more APIs within a target system. The disclosed system can further include a universal authorization layer that normalizes access requests and enforces policies across multiple identity providers and policy decision points via the APIs. The system can thus ensure seamless communication and policy enforcement across various identity providers and policy decision points, providing a robust and efficient solution for managing complex workflows in AI-driven environments.

Identity Management Systems and Workflows

Identity management systems can be critical components in modern information technology infrastructures, providing mechanisms for authenticating and authorizing users to access various resources within an organization. These systems are responsible for ensuring that only authorized individuals can access sensitive information and perform specific actions, thereby safeguarding the integrity and confidentiality of data. In order to manage user authorization with identity management systems, specific workflows are utilized to add and remove user privileges for various endpoints and data sources. These workflows typically involve several steps, including user authentication, role assignment, and the granting or revocation of access rights based on predefined policies. Effective management of these workflows is essential to maintain security and compliance with regulatory requirements. However, while enterprise systems can leverage and utilize a plurality of vendors and policy-decision points, identity management systems can often be limited to a single vendor, and can require extensive coding to extend to further vendors.

While AI technologies can enhance the capabilities of identity management systems by automating routine tasks, detecting anomalies, and providing predictive insights, integrating AI-based add-ons into existing identity management systems can require extensive training and prompt engineering. As various vendor-specific APIs can require diverse instructions, permissions, and constraints, the application of an AI-based add-on can demand new prompts and training data to ensure the AI correctly performs the workflow. However, the time and effort required to develop these prompts and training data can be prohibitive in efficiently incorporating agent-based workflows with new applications. Particularly, the extensive manual configuration and the possible weeks of work needed to connect an identity management system to a new application with an AI-based add-on can prevent the flexibility and growth of these identity management systems in enterprise operations.

The combination of these challenges, including diverse API syntaxes for different vendors and policy-decision points and the need for specialized prompt engineering for various integrations, can prevent the streamlining of identity management system integration with AI-based workflows. As such, a unified framework that can autonomously abstract the complexities of different APIs into machine-readable workflows and automatically execute these unique workflows in a zero-shot manner are desirable. Such a framework can not only simplify the integration process but further enhance the overall efficiency and security of identity management solutions in both human-driven and exclusively LLM agent-driven environments.

Embodiments Related to Zero-Shot AI Workflow Engines

FIG. 1 is an example system 100 for enabling agentic consumption of workflows for identity management systems with a zero-shot approach. System 100 can include an LLM agent 102 operable to request, analyze, and execute instructions to carry out a workflow, such as an identity management workflow. LLM agent 102 can include a natural language processor 104 for converting natural language inputs into machine-readable instructions, as well as a diagram processor 124 for interpreting and utilizing visual diagrams, such as mermaid diagrams. In some embodiments, LLM agent 102 can further include an action selector 126 operable to utilize machine-readable instructions and make an informed decision as to an action to be taken for execution of the workflow. System 100 can further include a workflow engine 106 in communication with LLM agent 102, workflow engine 106 operable to receive a desired workflow name and provide machine-readable instructions to LLM agent 102 for performance of the workflow. To facilitate interfacing with other LLM agent 102, workflow engine 106 can include a REST API gateway 108 for enabling communication over the internet or other communication method. Workflow engine 106 can further include a mermaid diagram generator 116, a next path generator 118, and an agent context manager 120, each operable to receive and convert a configuration file into formats usable by LLM agent 102 to execute the workflow. Workflow engine 106 can accordingly include an enhanced response builder 122 for generating the machine-readable response corresponding to the input workflow name, the machine-readable response usable in execution of the workflow. System 100 can further include one or more target system(s) 110 on which the workflow is to be performed or targeting. Target system(s) 110 can include an active directory 112 in which any create, read, update, and delete (CRUD) services are to be performed, and the API modules 114 which are used for creating or amending identity policies.

LLM agent 102 can be any AI-powered system operable to perform complex operations utilizing sequential reasoning for text-based instructions, leveraging large language models in the process, using at least natural language processor 104. LLM agent 102 can be provided a workflow name or identifier (e.g., "create_user_account") from a user or another AI system, with the workflow identifier representing a possible action to be taken against a specified API. In some embodiments, LLM agent 102 can be operable to handle user interaction steps, action steps executed against external systems, function steps executed via internal functions (e.g., Python functions), and perform parallel processing of collection steps. LLM agent 102 can be communicatively coupled to workflow engine 106, either through a direct connection or through REST API gateway 108. Accordingly, LLM agent 102 can provide the workflow name or identifier to workflow engine 106 to prompt the return of a machine-readable response to execute processes mapped to the workflow name or identifier.

As such, workflow engine 106 can access a stored configuration file outlining the corresponding workflow, and can further employ mermaid diagram generator 116 and next path generator 118 to parse the configuration file into actionable next steps and a visual representation of the workflow sate and decision paths. Mermaid diagram generator 116 can accordingly construct color-coded visual representations with edge labeling that account for decision conditions, which can be inherently understood by human operators, while also being usable by LLM agent 102 through diagram processor 124. The mermaid diagrams constructed by mermaid diagram generator 116 can represent the entire workflow, regardless of a current state, with each step (or node) including a corresponding status for the current state.

Similarly, next path generator 118 can identify the next step(s) to be taken based upon the current state of the workflow, including the decided next step, any nodes of the workflow triggered by the next step, an explanation of why the step was chosen, and any associated metadata (e.g., for parallel executions). Next path generator 118 can be utilized in tandem with mermaid diagram generator 116 to visualize all possible next steps, identify the chosen next step, and provide any related data and state information related to the chosen path. As such, the next step of the prompted workflow can be dynamically determined in workflow engine 106, while pre-evaluating any necessary conditions and providing explanations for the consequences of the step. Next path generator 118 can perform these functions for both the workflow as a whole, as well as for each specific node of the workflow, such that next path generator 118 can operate in both a node-centric and a workflow-centric manner. In some embodiments, next path generator 118 can be utilized to assess the entire workflow and identify steps that are available and permissible to be executed, as well as detailed explanations of consequences for each step in the workflow. In these embodiments, next path generator 118 can enable the construction of comprehensive execution roadmaps from the configuration file to guide LLM agent 102 through the complex processes of the workflow without any prior training or knowledge of the workflow or associated system. Thus, next path generator 118, along with the stored configuration file, can enable LLM agent 102 to execute the workflow in a zero-shot manner.

In at least one embodiment, next path generator 118 can be utilized for identifying nodes of the workflow that are ready for parallel execution while providing strict safety mechanisms to prevent premature execution of pending nodes. In these embodiments, next path generator 118 can check each node of the workflow to determine if any and all dependencies have been completed within the workflow. Next path generator 118 can utilize a dependency analyzer to iterate through all nodes of the workflow to ensure that all nodes dependent upon each checked node are considered completed prior to execution to ensure safe execution and to reduce possibly critical workflow errors. For each node with satisfied dependencies, the statuses of these nodes (e.g., completed, skipped, waiting, pending, failed, etc.) are checked by next path generator 118. The nodes that have satisfied dependencies and are in an acceptable state for execution can be appended to a running list of "ready nodes", such that the running list includes all nodes prepared for parallel execution. This running list can be compiled by next path generator 118 to be provided to LLM agent 102 for execution in parallel, thus reducing the runtimes of the workflow operations without risking premature execution while avoiding race conditions.

In some embodiments, any nodes that are pending or are without a status identifier can be considered ready for parallel execution if all other dependencies are satisfied. In contrast, nodes with identifiers indicating previous completion or failure can be omitted from the running list, as the operation has already been performed. Similarly, any nodes with identifiers indicating that the node is still waiting for input, that the node is stuck, or that the node has been skipped can be omitted from the running list to prevent workflow errors. The running list can thus be considered a "proceed" path that includes all nodes ready for safe parallel execution, while all other nodes remain in a pending, completed, skipped, or failed state without further operations. In instances with all nodes deemed "completed", next path generator 118 can return a "complete" path indicating that all nodes have reached a final state and that no further execution is possible at this time. Similarly, in instances with all remaining nodes deemed as "waiting" for dependent node operations, next path generator 118 can return a "waiting" path indicating that no nodes are ready or active for execution at this time. Further, any nodes that lack dependencies can be considered ready for parallel execution if enabled by the status identifiers, as discussed above.

During construction of next steps and mermaid diagrams for use by LLM agent 102, workflow engine 106 can further leverage an agent context manager 120 to aid in forming machine-readable instructions executable by LLM agent 102. Agent context manager 120 can communicate with an enhanced response builder 122, which can itself receive mermaid diagrams and next path information from mermaid diagram generator 116 and next path generator 118, respectively. Agent context manager 120 can be operable to provide explicitly structured instructions corresponding to the next path information, while further providing clear constraints of the workflow that can guide decision-making of LLM agent 102. In some embodiments, agent context manager 120 can further specify the desired success criteria that LLM agent 102 can use to measure accomplishment of the desired next step, while also providing a list of explicitly-allowed decisions to be made to prevent unexpected actions by LLM agent 102. In further embodiments, agent context manager 120 can receive information regarding the specific LLM agent 102 requesting the workflow, and can include protocol-specific guidance based on the type or limitations of LLM agent 102 executing the workflow. Thus, agent context manager 120 can ensure that LLM agent 102 performs the workflow within defined boundaries found in the configuration file, while also enabling LLM agent 102 to have a degree of flexibility for more complex scenarios. Further, agent context manager 120 can track a state of the workflow across multiple steps, such that agent context manager 120 provides LLM agent 102 with a persistent memory of prior steps taken and corresponding results.

In at least one embodiment, enhanced response builder 122 can utilize a pluggable, component-based builder pattern with abstract base classes for different response components to enable extensible, maintainable response constructions. Each portion of the final response can be constructed using a sub-builder with an abstract base class, with each sub-builder providing a component of the final response if needed, while the core operation of enhanced response builder 122 constructs the final response in a consistent manner using the provided components. As such, new components can be added to enhanced response builder 122 without modifying the core operations of enhanced response builder 122 through the pluggable nature of the architecture. With each sub-builder handling a single subportion of the response, asynchronous operations can be performed independently of one another, while a consistent, abstract interface is provided between the sub-builders and enhanced response builder 122. This pluggable, component-based architecture can simplify development of response modifications, reducing development time by up to about 40% while preventing modification of the core operations of enhanced response builder 122. The architecture can accordingly enable the inclusion of client-specific, custom components and the development of additional response component functionality by third-party developers, enhancing the modularity and deployment of enhanced response builder 122.

Further, in at least one embodiment, enhanced response builder 122 can leverage a deterministic transformation pipeline operable to flatten nested result hierarchies with multiple "result" keys into a single-level structure for guaranteeing a singular "result" object in the response and preventing schema ambiguity. The deterministic transformation pipeline can extract all top-level fields of a nested result hierarchy (excluding any "result" keys indicating the data type). Using these top-level fields, the deterministic transformation pipeline can extract any inner "result" objects from the top-level structure to isolate the result corresponding to each top-level field. The deterministic transformation pipeline can then extract any "nested" results from the inner structure under each top-level field, if these inner structures are present for the current top-level field. The inner and nested results can then be merged into a single dictionary that is mapped to the corresponding top-level field. The deterministic transformation pipeline can output a merged, flattened result that includes the top-level field with the merged dictionary of results in a single-level structure that can be utilized in zero-shot execution for deterministic parsing without passing the entire nested result hierarchy to the LLM agent 102.

Workflow engine 106 can provide all interpreted information and data regarding next steps, limitations, inputs, and possible paths to enhanced response builder 122. Enhanced response builder 122, in concert with agent context manager 120, can construct an AI-focused response that can enable LLM agent 102 to perform the workflow tasks autonomously without additional prompting, and without any initial training. In some embodiments, enhanced response builder 122 can primarily convert interpreted instructions from the configuration file to form a machine-readable response in a desired format (e.g., a JSON file). In these embodiments, enhanced response builder 122 can differ from traditional systems, which provide human-facing forms or unstructured text in response to a workflow request. While the aforementioned configuration file can be provided as a human-readable YAML connector file, the machine-readable format constructed by enhanced response builder 122 can be tailored to specifically guide untrained LLM agent 102 through the desired steps.

In at least one embodiment, workflow engine 106 and LLM agent 102 can leverage state version tracking and idempotency keys to provide concurrency control mechanisms for the various operations performed in the workflow. In these embodiments, workflow engine 106 can utilize a monotonic state version to provide optimistic concurrency control to enable operations prior to committing the operation result to the overall workflow, while preventing committing the operation result if the state version does not match the current server version. In this way, the operations can run independently until the point of returning a value to the workflow engine 106, at which point the consistency of the data and state version are either verified as matching, or the operation is aborted and retried. To maintain consistency during concurrent operations, workflow engine 106 can further utilize idempotency keys, which may be client-chosen identifiers, to determine if the operation has been performed previously, and whether the "retry" of the operation is a duplicate request that can be safely deduplicated. Further, workflow engine 106 can utilize continuation tokens to provide an additional layer of safety for retries or workflow resumptions during concurrent operations. The use of monotonic state versions, idempotency keys, and/or continuation tokens can accordingly provide multiple layers of security during concurrent operations to prevent inconsistencies and workflow errors for enterprise-scale workflows with many concurrent workflow operations.

In some embodiments, enhanced response builder 122 can leverage a deterministic transformation pipeline in place of AI-based conversion. In an initial configuration, enhanced response builder 122 extracts essential fields from raw input dictionaries (e.g., via a "coerce_to_enhanced_result( )" function). Similarly, any nested dictionaries can be flattened therein to construct a consistent, single-level structure from which to build the enhanced response. In this initial configuration, enhanced response builder 122 can separate top-level API fields such as status, message, and correlation ID from the remainder of the content provided to enhanced response builder 122. Using the extracted, normalized structure, enhanced response builder 122 can enhance the context of the provided raw data in order to enhance the value of the output response for downstream consumers. In these embodiments, helper functions (e.g., "build_required_action( )" or "extract_validation_rules( )") can be employed to produce specific instructions, templates, or requirements to aid the construction of the enhanced response, and further aid in converting the YAML connector file to specific action items in the enhanced response. Further, enhanced response builder 122 can utilize workflow intelligence integration steps in order to deterministically identify next steps and construct visualizations. These workflow intelligence integration steps can include next path determination through graph traversal, node analysis for dependencies and conditions, and programmatic generation of mermaid diagrams. Finally, enhanced response builder 122 can perform protocol standardization steps for transforming node definitions into standardized protocols for execution, while any constraints, capabilities, and decision frameworks are explicitly mapped in enhanced response builder 122. Thus, enhanced response builder 122 can perform the transformation in a rules-based, deterministic approach that leverages well-defined data mapping procedures in place of AI-powered interpretation, in order to produce an enhanced JSON output for execution by LLM agent 102. The response generated via enhanced response builder 122 can conform to type validation models for all response fields, and can further provide a type-safe structure to prevent data operations on values of mismatched typing. During operation, enhanced response builder 122 can provide the machine-readable response to LLM agent 102 for execution of the detailed instructions and decision tree. LLM agent 102 can utilize a diagram processor 124 to natively understand and employ mermaid diagrams from workflow engine 106, enabling LLM agent 102 to reference possible paths and requirements for each path during execution of the workflow. LLM agent 102 can further utilize an action selector 126, such that LLM agent 102 can assess a current state of the workflow against the machine-readable response and determine and execute an ideal next step to accomplish the desired goal of the workflow.

In some embodiments, LLM agent 102 must return to workflow engine 106 for a further next step after each executed action. The enhanced JSON response provided to LLM agent 102 can directly provide a structured interaction loop for carrying out a workflow through the execution of a single step at a time. As such, workflow engine 106 can provide the enhanced JSON response which contains clear instructions, a specified API endpoint, a set of validation rules and examples, and a visualization of the possible next paths to be taken by LLM agent 102. LLM agent 102 can utilize the enhanced JSON response to execute only the current step for which the clear instructions are provided. Following this execution, LLM agent 102 can submit the completed step, along with any corresponding results and statuses, back to workflow engine 106. Workflow engine 106 can then process the success or failure of the step and determine new instructions for the next step to be taken in the workflow, which is returned to the LLM agent 102 as a new enhanced JSON response.

As such, system 100 can enable the autonomous determination of next steps, consequences, and constraints for a workflow using only a workflow name or identifier as an input. Through the use of workflow engine 106, system 100 can provide LLM agent 102 with structure instructions that can include an overall workflow visualization, global next steps to be taken in the workflow, node-specific decision options based on a current state, visual representations of each node's possible path, explicitly detailed AI agent prompts, and domain-specific insights for the desired workflow. Workflow engine 106 can enable the automatic execution of the workflow on target system 110 and through API modules 114 to perform the desired services related to identity management services.

Figure 2:
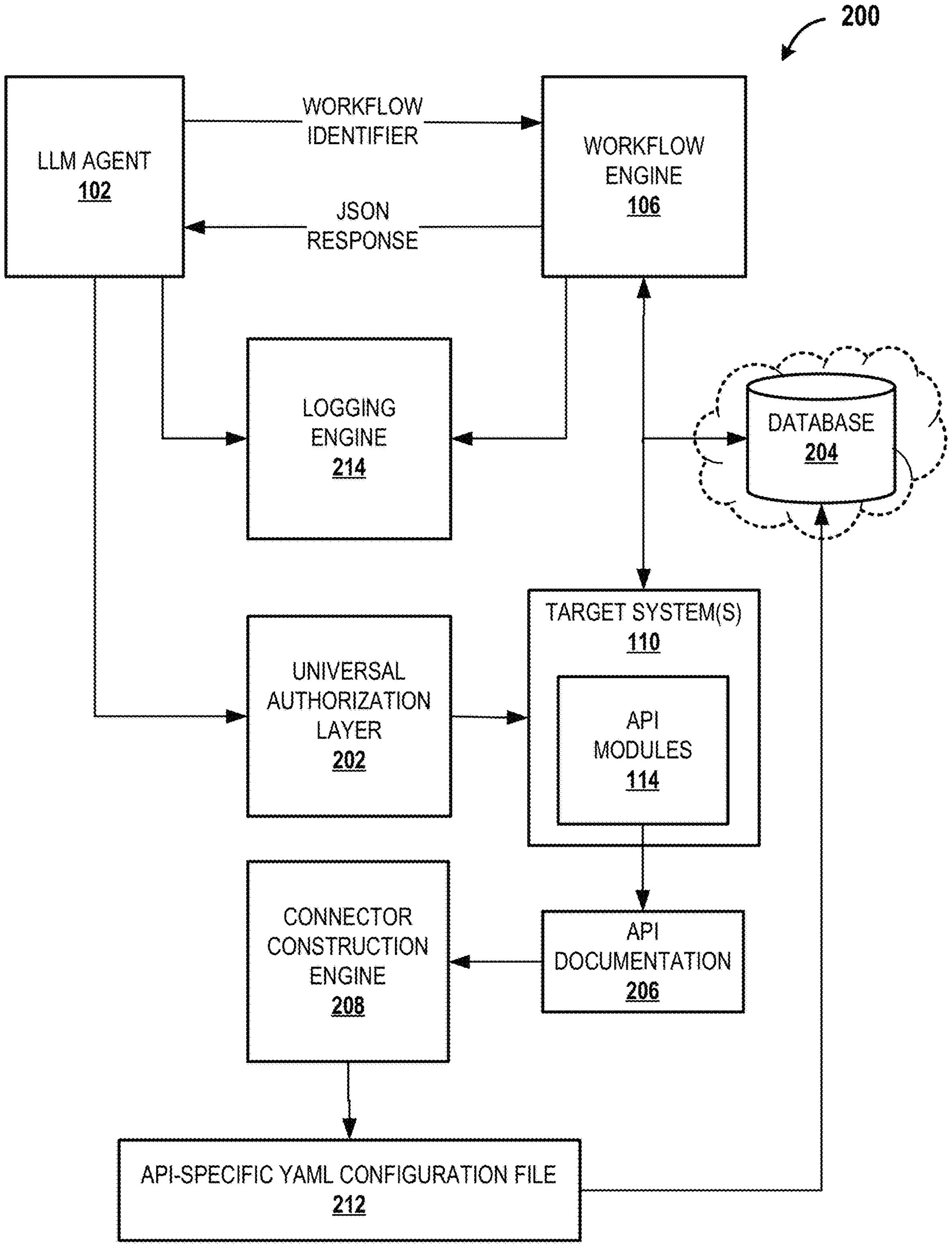
FIG. 2 is an example system for autonomously adding new API-specific workflow capabilities for execution by an LLM agent, according to one or more embodiments of the present disclosure.

FIG. 2 is an example system 200 for autonomously adding new API-specific workflow capabilities for execution by LLM agent 102. System 200 can include LLM agent 102, workflow engine 106, and target system(s) 110, such that LLM agent 102 can perform the desired workflow on target system 110 in a zero-shot manner. System 200 can further include a universal authorization layer 202 operable to normalize access requests and enforce policies across multiple identity providers and policy decision points for target system(s) 110. System 200 can include a database 204 communicatively coupled with workflow engine 106 and target system 110, database 204 including a plurality of configuration files built for various APIs and workflows. To enable the integration of new API functionality for workflow engine 106, system 200 can include one or more pieces of API documentation 206 corresponding to API modules 114 of target system(s) 110, as well as a connector construction engine 208 operable to construct an API-specific YAML configuration file from API documentation 206. In some embodiments, LLM agent 102 and workflow engine 106 can be in communication with a logging engine 214 for recording all identity-related operations in a standardized audit format.

In operation, LLM agent 102 can provide a workflow name or identifier to workflow engine 106 in order to obtain a machine-readable JSON response for execution on LLM agent 102. In some embodiments, workflow engine 106 can detect, via an API endpoint, when LLM agent 102 is executing a workflow without prior context, and can provide the JSON response to LLM agent 102. In these embodiments, workflow engine 106 can communicate with target system 110 to identify the API modules 114 that are to be employed or targeted in the workflow. In some embodiments, workflow engine 106 can reference database 204, which can be locally-stored or cloud-operated, to receive an API-specific configuration file from corresponding to API modules 114. In these embodiments, an available configuration file can be provided to workflow engine 106 for construction of the JSON response, as discussed in FIG. 1. In further embodiments, however, API modules 114 can represent new functionality to be added to database 204 and workflow engine 106. In these embodiments, system 200 can extract API documentation 206 corresponding to the desired API against which the workflow is to be executed.

API documentation 206 can include textual descriptions of possible operations as well as paths, constraints, and consequences for each operation. API documentation can be provided to connector construction engine 208 for the production of a new configuration file for the workflow and API to be added. Connector construction engine 208 can leverage a separate AI agent to receive API documentation 206, parse the textual descriptions throughout API documentation 206, and construct a new configuration file, such as API-specific YAML configuration file 212. Unlike LLM agent 102, the AI agent of connector construction engine 208 can be extensively trained to produce API-specific YAML configuration file 212 from input API documentation 206. Connector construction engine 208 can facilitate the extraction of API-specific information such as the instructions, success criteria, constraints, contexts, and next steps for a workflow found in API documentation 206, as well as the conversion of this information into a digestible YAML structure with endpoints, transforms, scopes, and other pertinent data. In some embodiments, API-specific YAML configuration file 212 can be open-ended regarding the identity management software to be targeted, such that the file includes a generalized fabric which any system can use, including various identity management systems, LLM agents, and other orchestration engines.

In some embodiments, connector construction engine 208 can utilize template-based command generation to transform static code found in API documentation 206 into dynamic, template-driven YAML configurations while maintaining version control and performing schema validation. In these embodiments, connector construction engine 208 can employ typed expression evaluation to differentiate between string outputs and other formats, dynamic rendering control to perform multi-pass rendering for complex transformations, and conditional command generation that can enable the use of extensive conditional statements in generating the configuration files. Further, connector construction engine 208 can include multi-protocol support to enable a variety of protocols (e.g., LDAP, SSH, REST) to be used in command generation through a single, unified configuration structure. In some embodiments, the use of parameterized commands to dynamically generate commands via specified templates and a response transformation pipeline to post-process raw responses into expressional-based syntax can further aid connector construction engine 208 in constructing API-specific YAML configuration file 212.

In further embodiments, connector construction engine 208 can implement a factory method pattern for dynamically loading and instantiating connector classes from existing YAML configuration files using plugin-based discovery. In these embodiments, connector construction engine 208 can include a configuration loader to read YAML-based connector registry files with connector type definitions, module paths, and class names. The configuration loader can load a connector registry containing arrays of connector definitions, and can cache these loaded configurations using a time-to-live (TTL) caching method to set maximum file sizes and expiration times to reduce the file input and output. The TTL caching method can use connector type and configuration information as cache keys that can be returned prior to expiration, and can enable the creation of new instances upon expiration of existing cached data. In some embodiments, the configuration loader can further validate the configuration structure and raise errors for any invalid formats in the structure. Connector construction engine 208 can dynamically load these connector classes from specified modules using the plugin-based discovery mechanism, and can further resolve module and class names from the registry entries. The input errors identified by the configuration loader can be handled via the plugin-based discovery mechanism to provide detailed error messages. The plugin-based discovery mechanism can support custom connector directories for extensibility of the connector construction engine 208.

In some embodiments, the factory method pattern can instantiate connectors with credential management, execution context, and system configurations when using existing YAML or JSON configuration file formats. The factory method pattern can accept a connector type, a configuration dictionary, execution context, and a system name, and can use introspection for determining constructor parameters dynamically therefrom. Any dependencies accepted by the factory method pattern can be passed to further components of the connector construction engine 208, such that a connector instance is returned that automatically implements a base connector interface. These connector instances can provide protocol-agnostic command definitions, connection parameters, authentication requirements, and transformation rules that are compiled into executable command objects for execution by LLM agent 102.

In some embodiments, API-specific YAML configuration file 212 can include a hierarchical structure with specific execution semantics for use in desired functions. Each API-specific YAML configuration file 212 (or any system-level configuration file) can include a header section for a name, version, connection, and other bibliographical information, as well as a commands map. The commands map can include a plurality of possible actions, with each entry of the commands map itself being a valid YAML fragment that can define a single executable action. Each of these actions, or command fragments, can describe a single protocol (e.g., HTTP REST method, SSH/Telnet command, LDAP/ODBC query or procedure) supported by connector construction engine 208. Each command fragment can itself include declarative fields such as endpoint, method, body, transform, retry, or idempotent. These command fragments can be recursively compiled into a protocol-agnostic command object by connector construction engine 208 or enhanced response builder 122, which conforms to the platform of interest's canonical execution schema. In some embodiments, the command object can be invoked directly (e.g., via LLM agent 102) in a single API call for direct action. In further embodiments, however, the command object can be inserted into a workflow graph as a vertex, or action node, that can be managed by workflow engine 106 for a directed acyclic workflow. In these embodiments, any dependencies and parallelisms can be derived from topology of the workflow graph within workflow engine 106.

Following construction of API-specific YAML configuration file 212 via connector construction engine 208, the new API-specific YAML configuration file 212 can be provided to database 204 for future use. As such, database 204 can continue to compile a collection of YAML configuration files for use in workflow engine 106 to construct the machine-readable response that will enable LLM agent 102 to perform a workflow in a zero-shot manner. With API-specific YAML configuration file 212 included in database 204, workflow engine 106 can access API-specific YAML configuration file 212 to construct the JSON response to be returned to LLM agent 102. As LLM agent 102 executes the workflow using the JSON response, any actions, results, and success criteria can be logged in logging engine 214 to maintain an auditable record of automated actions taken. To perform the various actions of the workflow, LLM agent 102 can route communication through universal authorization layer 202 to provide vendor-agnostic normalization of requests and policies across multiple identity providers and policy decision points.

In some embodiments, logging engine 214 can provide a comprehensive event taxonomy defining a comprehensive set of 200 or more standardized event types that contain workflow operations, connector actions, node executions, and system events. Throughout the workflow execution, logging engine 214 can perform structured JSON logging to track performance and event timing during operation. Logging engine 214 can utilize unique correlation IDs for each workflow operation in the event taxonomy. These unique correlation IDs are then propagated through all related log entries and system components by logging engine 214 to enable event-based traceability throughout the workflow. This event-based traceability can provide an audit trail during workflow operations to enable event tracking using these unique correlation IDs for pinpoint error debugging and audit compliance.

Example Methods

Figure 3:
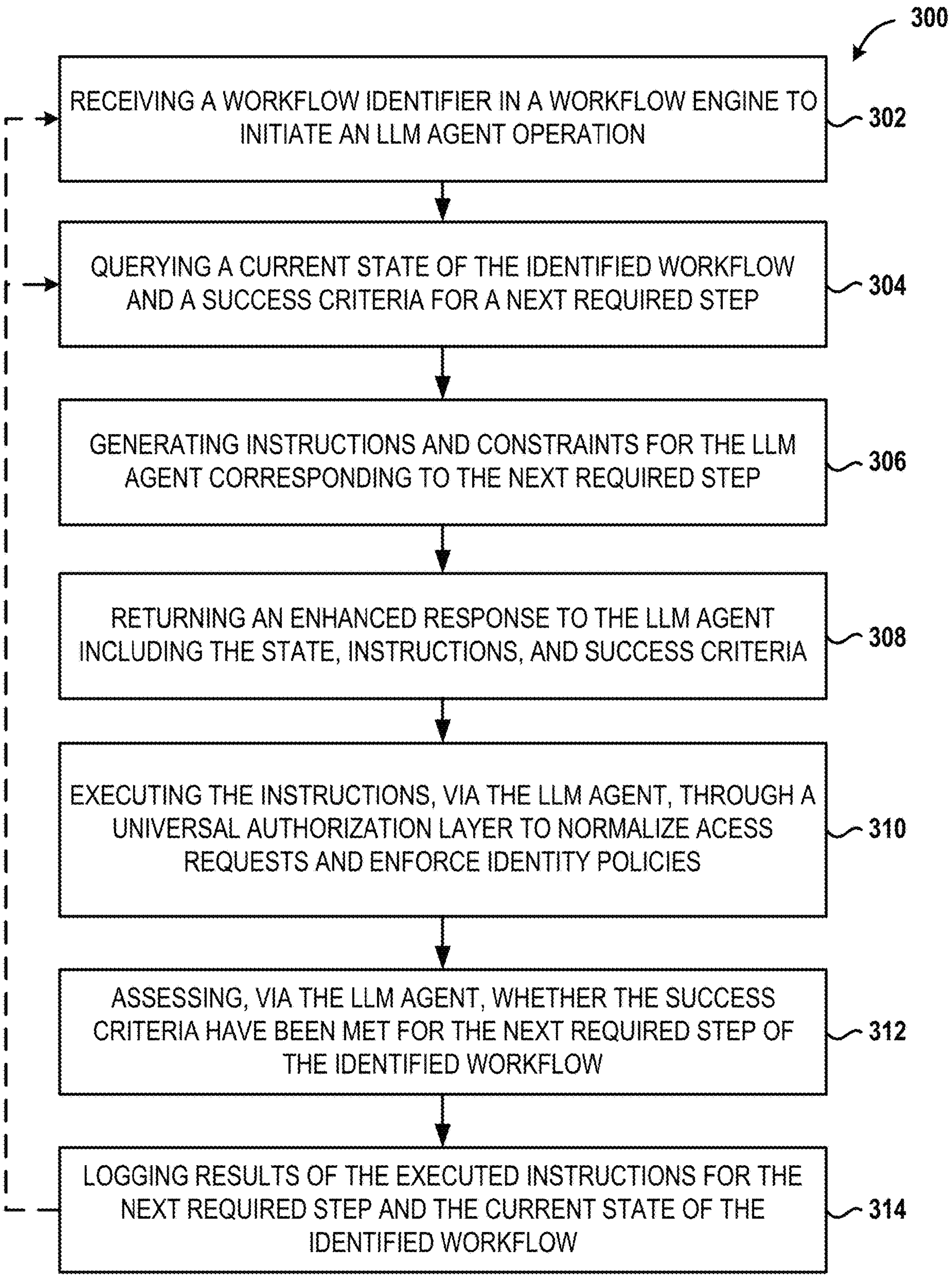
FIG. 3 is an example method for executing a workflow via an LLM agent in a zero-shot execution with only a workflow identifier as an input, according to one or more embodiments of the present disclosure.
Figure 4:
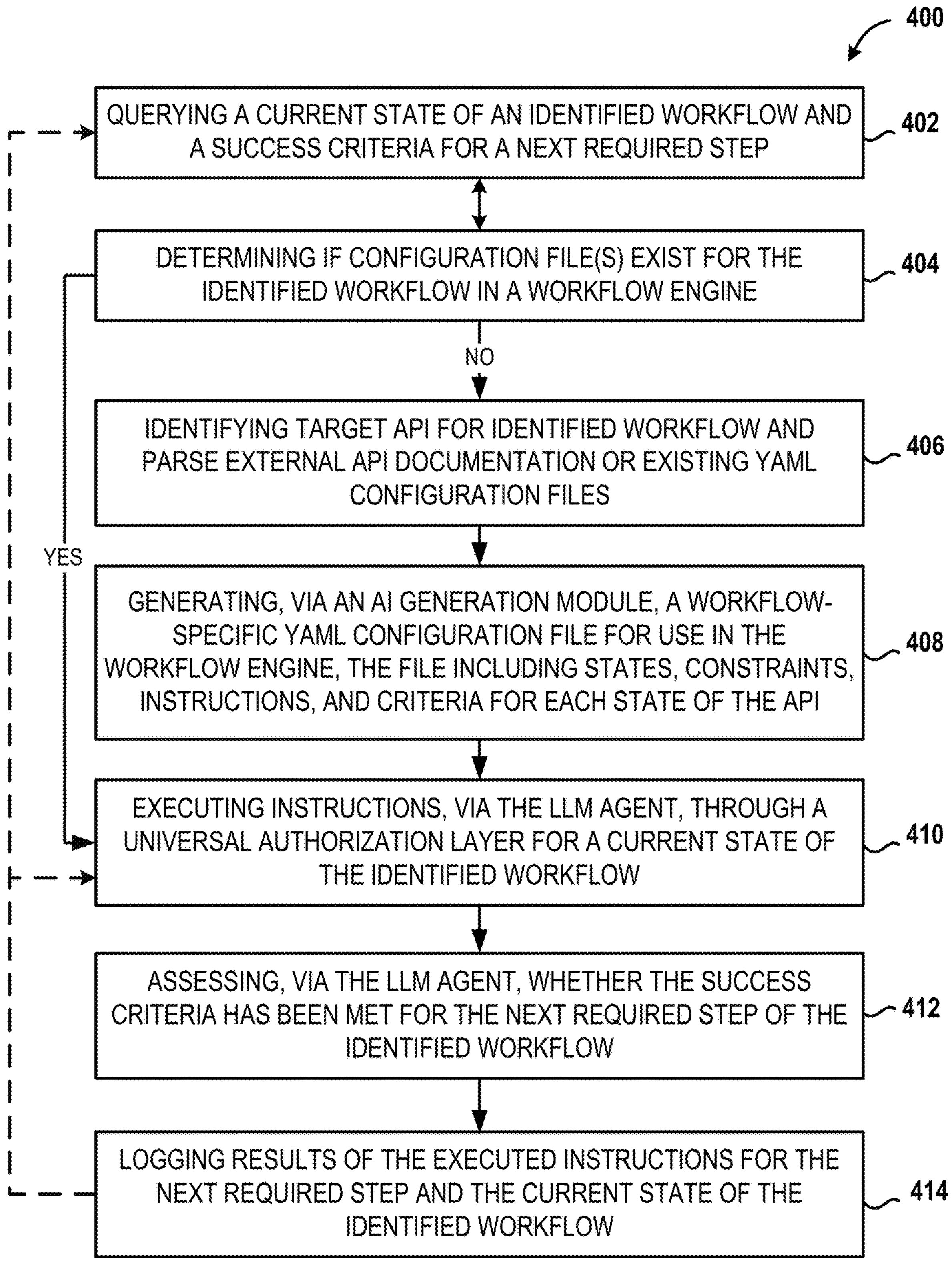
FIG. 4 is an example method for executing a workflow via an LLM agent for a process without a pre-constructed configuration file in a zero-shot manner, according to one or more embodiments of the present disclosure.
Figure 5:
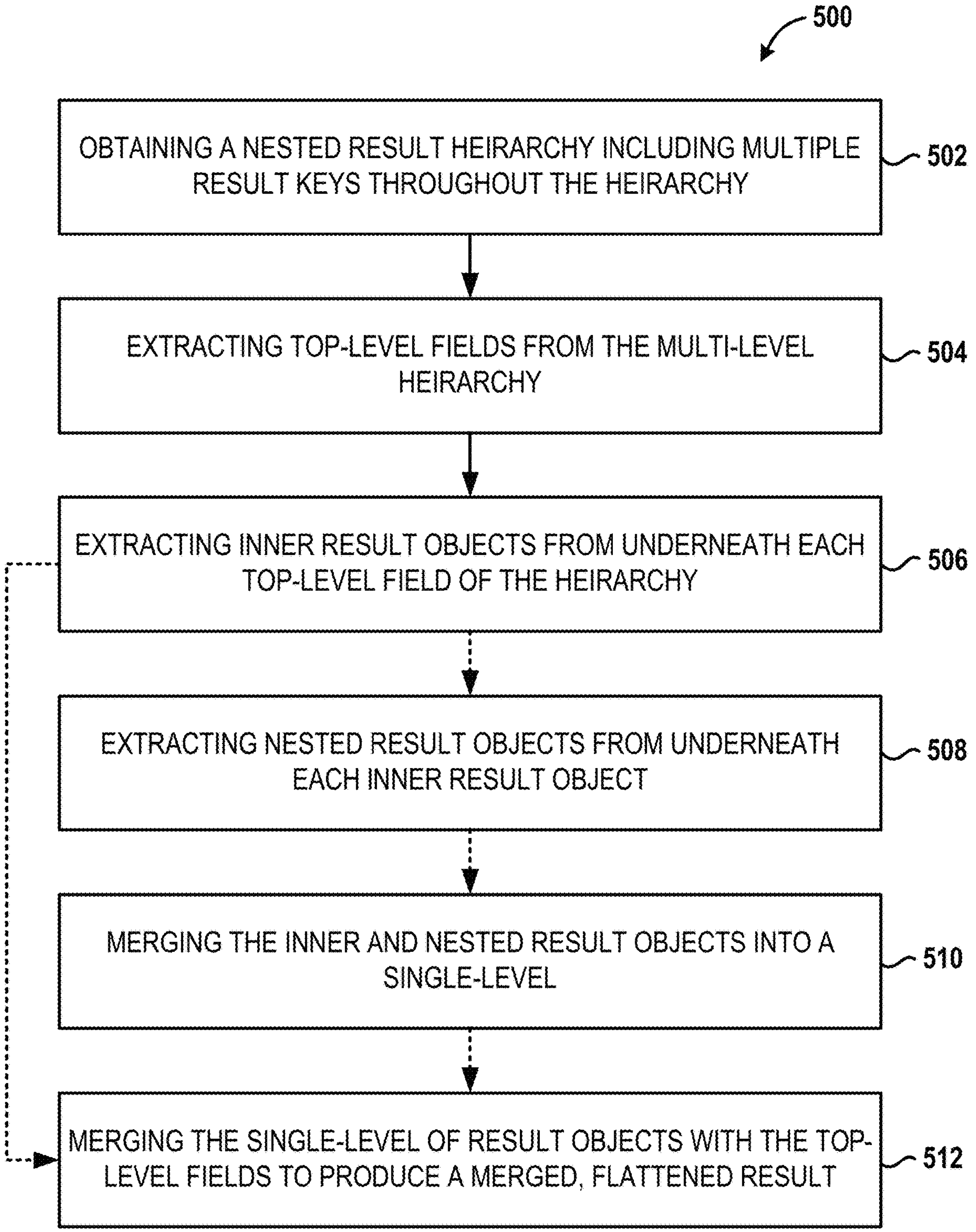
FIG. 5 is an example method for flattening nested result hierarchies into a single-level structure, according to one or more embodiments of the present disclosure.

In view of the structural and functional features described above, example methods will be better appreciated with reference to FIGS. 3-5. While, for purposes of simplicity of explanation, the example methods of FIGS. 3-5 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods, and conversely, some actions may be performed that are omitted from the description.

FIG. 3 illustrates a method 300 for executing a workflow via an LLM agent in a zero-shot execution with only a workflow identifier as an input, according to one or more embodiments of the present disclosure. Method 300 can be implemented by systems 100 and 200, as shown in FIGS. 1-2. As such, reference may be made to the examples of FIGS. 1-2 in the description of method 300. Method 300 can begin at 302 with receiving a workflow identifier in a workflow engine (e.g., workflow engine 106) to initiate operation of an LLM agent (e.g., LLM agent 102). The workflow identifier, or name, received at 302 can correspond with a CRUD service to be performed for a desired API or identity management solution, such as creating a user or updating credentials. Method 300 can thus begin with the receipt of only an identifier or name to identify the desired workflow at 302, such that no additional information or context is provided in the input. Using the workflow identifier, method 300 can continue at 304 with querying, via the workflow engine, a current state of the identified workflow, as well as a success criteria corresponding to the next necessary step of the workflow. The state of the identified workflow can be retained within workflow engine (e.g., via agent context manager 120), such that the history and status of each workflow is available for reference by and for LLM agents. In some embodiments, the next required step and success criteria can be identified via a next path generator (e.g., next path generator 118) to assess the workflow found on a corresponding configuration file (e.g., API-specific YAML configuration file 212) and extract the subsequent steps to be taken.

Method 300 can then continue at 306 with generating instructions and constraints for the LLM agent to perform the next required step identified at 304. In some embodiments, an enhanced response builder (e.g., enhanced response builder 122) can construct a machine-readable response to be used by the LLM agent to perform the next required step. In these embodiments, the machine-readable response can include all relevant constraints, validations, and steps to be taken, and each piece of information can be translated into an LLM agent-preferred format (e.g., a JSON response). Thus, method 300 can continue at 308 with returning the enhanced response to the LLM agent, with the response including each of the current state, the recommended instructions, and the criteria defining a successful operation. The enhanced response can enable the LLM agent to understand the workflow structure, constraints, logical paths, and desired results related to the identified workflow.

Method 300 can then continue at 310 with executing the instructions of the enhanced response to perform the desired workflow operations. In some embodiments, at 310, the LLM agent can perform the instructions through a universal authorization layer (e.g., universal authorization layer 202) in order to standardize any access requests while enforcing policies across multiple identity providers and policy decision points. As such, the LLM agent can execute the workflow in a vendor-agnostic manner, with the universal authorization layer providing any normalization for interfacing with a target system or identity service provider. At 312, and using the provided instructions, the LLM agent can assess the success of the next required step executed at 310. As the enhanced response included success criteria, the LLM agent can compare the result of the executed step against the proposed criteria to determine whether to proceed with further instructions or report a successful operation.

Regardless of the success or failure of the executed workflow at 310, method 300 can continue at 314 with logging the results of the executed instructions and the current state of the workflow. In some embodiments, a logging engine (e.g., logging engine 214) can write the results and state of the workflow in an auditable format, and can further provide the state of the workflow to the agent context manager for maintaining a state of the workflow in the workflow engine for further reference. Depending upon the success or failure of the workflow at 312, method 300 can return to 302 with the receipt of a further workflow identifier or name. In some embodiments, however, method 300 can return to 304 with querying a current state and identifying the next step and success criteria. In these embodiments, the LLM agent can continue to cyclically execute, or receive instructions from the workflow engine, without further input to accomplish the task of the identified workflow while assessing and logging results between each executed step.

FIG. 4 is an example method 400 for executing a workflow for a process without a pre-constructed configuration file in a zero-shot manner, according to one or more embodiments of the present disclosure. Method 400 can be implemented by systems 100 and 200, as shown in FIGS. 1-2. As such, reference may be made to the examples of FIGS. 1-2 in the description of method 400. Method 400 can begin at 402 with querying, via the workflow engine, a current state of the identified workflow, as well as a success criteria corresponding to the next necessary step of the workflow. The state of the identified workflow can be retained within workflow engine (e.g., via agent context manager 120), such that the history and status of each workflow is available for reference by and for LLM agents. In some embodiments, the next required step and success criteria can be identified via a next path generator (e.g., next path generator 118) to assess the workflow found on a corresponding configuration file (e.g., API-specific YAML configuration file 212) and extract the subsequent steps to be taken.

If, during the initial querying at 402, an error occurs regarding the possible next required step, method 400 can continue at 404 with determining if a configuration file exists for the identified workflow. At 404, a connected database (e.g., database 204) or memory of the workflow engine itself can be queried to identify the available configuration file, or lack thereof. If no configuration file is found or identified at 404, method 400 can continue at 406 with identifying a target API for the identified workflow. The identified workflow can correlate with the target API (e.g., API module(s) 114) through which the desired CRUD service can be performed, and external API documentation (e.g., API documentation 206) can be sourced for the target API. Further, at 406, the API documentation can be parsed to extract the textual descriptions and code structures for the target API.

Method 400 can continue at 408 with generating, via an AI generation module (e.g., connector construction engine 208), the workflow/API-specific configuration file to be used by the workflow engine to instruct the LLM agent. The configuration file can include each of the states, constraints, instructions, and criteria for each state of operations of the API, such that any scenario and operation can be undertaken. In some embodiments, the configuration file is a YAML file presenting the previously-discussed information in a plain text format, such that both humans and AI agents can read and edit the file. In further embodiments, however, the configuration file can be of any configuration file type, without departing from the scope of the present disclosure. In the disclosed embodiment, the configuration file can be passed through the workflow engine to generate a machine-readable response for the LLM agent to perform the desired next step of the workflow.

Method 400 can continue at 410 with executing the instructions, via the LLM agent, to perform the desired operation based upon a current state of the identified workflow. In embodiments in which the configuration files were pre-existing at 404, method 400 can continue at 410 directly from 404 without using the connector construction engine. Regardless of the initial existence of the configuration file, method 400 can continue with performance the desired workflow tasks at 410, while further passing the executed commands through a universal authentication layer to maintain the vendor-agnostic nature of method 400.

At 412, and using the provided instructions, the LLM agent can assess the success of the next required step executed at 410. As the enhanced response included success criteria, the LLM agent can compare the result of the executed step against the proposed criteria to determine whether to proceed with further instructions or report a successful operation. Regardless of the success or failure of the executed workflow at 410, method 400 can continue at 414 with logging the results of the executed instructions and the current state of the workflow. In some embodiments, a logging engine (e.g., logging engine 214) can write the results and state of the workflow in an auditable format, and can further provide the state of the workflow to the agent context manager for maintaining a state of the workflow in the workflow engine for further reference. Depending upon the success or failure of the workflow at 412, method 400 can return to 402 with querying a current state and identifying the next step and success criteria. As such, the next step in the workflow can be identified at 402, and cyclical performance of method 400 can continue as the workflow is executed. In some embodiments, however, method 400 can return to 410 with executing further instructions of the decision tree included in the original instructions, such that complex workflows can be carried out without further input or assessment, such as in the case of failure at 412. Thus, the LLM agent can continue to cyclically execute, or receive instructions from the workflow engine, without further input to accomplish the task of the identified workflow while assessing and logging results between each executed step.

FIG. 5 illustrates a method 500 for flattening nested result hierarchies into a single-level structure, according to one or more embodiments of the present disclosure. Method 500 can be implemented by systems 100 and 200, as shown in FIGS. 1-2. As such, reference may be made to the examples of FIGS. 1-2 in the description of method 500. Method 500 can begin at 502 with obtaining a nested result hierarchy that includes multiple "result" keys distributed throughout a multi-level hierarchy. The input nested result hierarchy can include result information utilized in a workflow engine (e.g., workflow engine 106), but the multi-level structure can result in schema instability for LLM agents used in task execution (e.g., LLM agent 102). As such, method 500 can continue at 504 with extracting top-level fields from the multi-level hierarchy to provide context for each result that can be extracted from the input nested result hierarchy. In some embodiments, all information from the top-level fields can be extracted, with the exception of any "result" keys indicating that the field includes result-type data. Using these top-level fields, any inner "result" objects can be extracted from the input nested result hierarchy at 506. The connections of these inner "result" objects with the top-level fields are maintained during method 500 to ensure proper, deterministic parsing by the LLM agents.

Following extraction of the inner "result" objects, method 500 can continue at 508 with extracting any nested "result" objects that are present under these inner "result" objects, which are similarly connected with the top-level fields and the previously-extracted inner "result objects. For instances including these nested "result" objects, method 500 can continue at 510 with merging the inner and nested "result" objects into a single level including all pertinent information extracted at 506 and 508. This single level of "result" objects can then be combined with the connected, corresponding top-level fields at 512 to generate a single level data structure that includes the top-level identifying information directly followed by any "result" objects found within each layer of the hierarchy therebelow. For any instances without nested "result" objects, however, method 500 can omit steps 508 and 510, and can continue at 512 with the generation of a single-level data structure that includes the top-level fields and the inner "result" objects. These single-level data structures can provide a merged, flattened result that includes the top-level field with the merged dictionary of results that can be utilized in zero-shot execution for deterministic parsing without passing the entire nested result hierarchy to the LLM agent, thus preventing any ambiguity in the schema utilized by the LLM agent.

Example Implementations

FIG. 6 is a sample connector 600 for an example of API-specific YAML configuration file 212, according to one or more embodiments of the present disclosure. Sample connector 600 includes a general name 602 for the service to which connector 600 is to facilitate connection. In the illustrated embodiment, name 602 denotes that connector 600 is for a SERVICENOW® software component. Connector 600 can further include any AI metadata 604 to be further provided to workflow engine 106 of FIGS. 1-2, including a description of connector 600, any capabilities included therein, and any context required to utilize connector 600. Further, connector 600 can include a listing of any possible operations 606 that can be performed in the specific API. As an example, connector 600 includes a "create_incident" operation 608, which itself includes the endpoints of the API, the method to be performed (e.g., HTTP POST method), any authorization requirements to be met by an identity management system, and any transforms to be applied. While sample connector 600 displays a single operation 608, listing of possible operations 606 can include any number of operations that can be performed on the target API, without departing from the scope of this disclosure. Sample connector 600 can be constructed via connector construction engine 208 of FIG. 2, such that sample connector 600 is the distilled and parsed version of a corresponding API documentation for the target API.

FIG. 7 is a sample machine-readable response 700 to be used by an LLM agent in executing an identified workflow, according to one or more embodiments of the present disclosure. Machine-readable response 700 is presented in a JSON format, which is to be received by the LLM agent in response to a provided workflow identifier. Machine-readable response can include workflow context 702, which can be provided by agent context manager 120 of FIG. 1, to provide the workflow identifier, the current active node of the workflow, and the current state of the workflow at the active node. The LLM agent can utilize the workflow context 702 to serve as a persistent memory of prior results, as well as to verify that the active node and current state match the desired operations. Machine-readable response 700 can further include AI execution context 704, provided, for example, by enhanced response builder 122 of FIG. 1. AI execution context 704 can include all of the instructions, required checks, success criteria, constraints, and examples (such as valid responses), that LLM agent 102 of FIGS. 1-2 can use to execute the desired workflow. Further, machine-readable response 700 can include prescribed next steps for the desired workflow, such that the LLM agent can identify the overall workflow path and the next step or node that will continue the workflow. Machine-readable response 700 can provide all necessary information for an LLM agent to perform the desired workflow successfully, under the prescribed constraints, and in a zero-shot manner.

Figure 8:
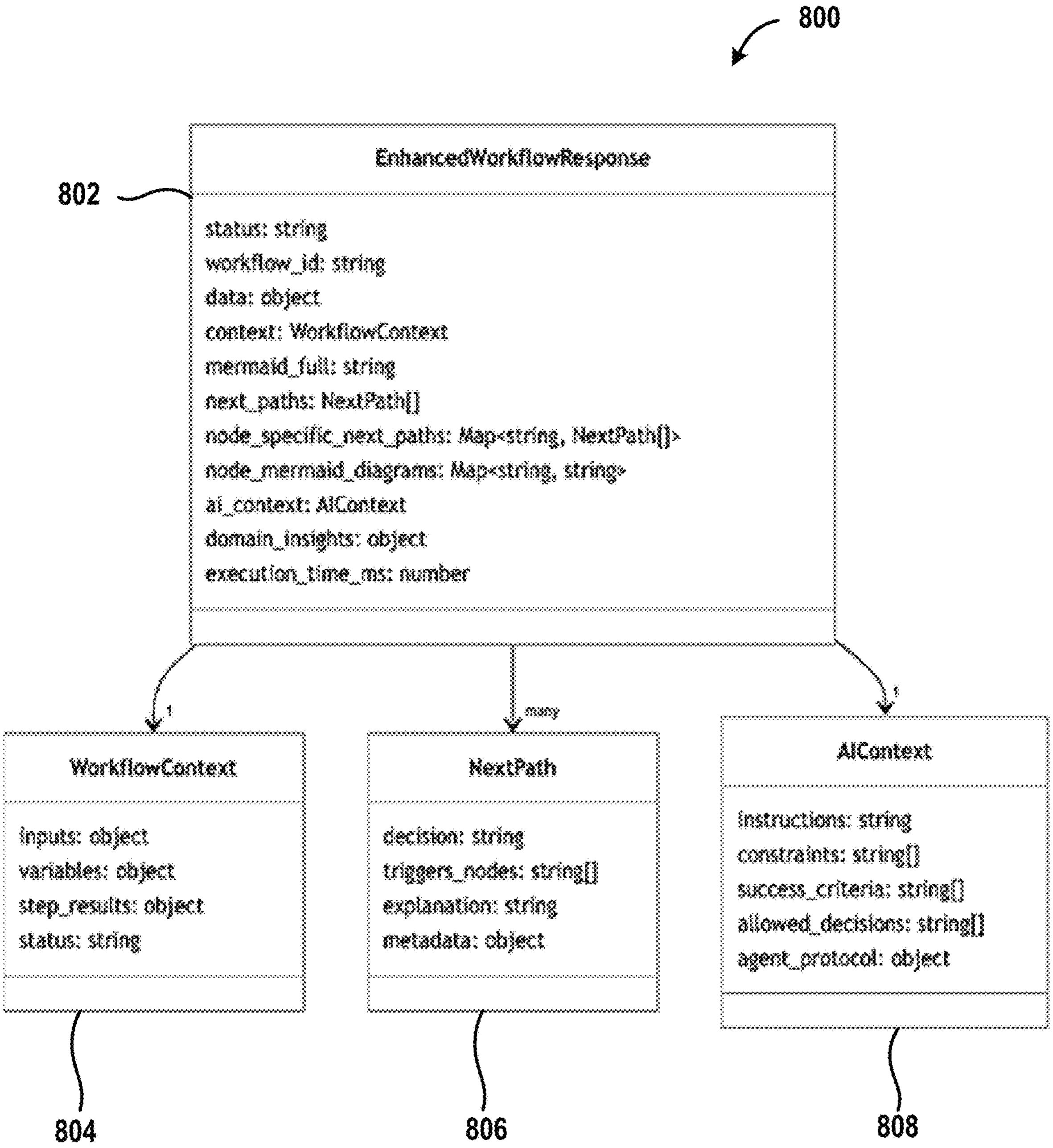
FIG. 8 is an example mermaid diagram representing the construction method of a machine-readable response for executing an input workflow, according to one or more embodiments of the present disclosure.

FIG. 8 is an example mermaid diagram 800 of the construction of a machine-readable response for executing an input workflow, according to one or more embodiments of the present disclosure. Mermaid diagram 800, as illustrated, is represented with the enhanced response 802 being formed of components parts: workflow context 804, next path information 806, and AI context 808. As discussed previously, enhanced response 802 can include all of the statuses, context, diagrams, instructions, and logging information for the desired workflow, which can be provided to an LLM agent for execution. As part of enhanced response 802, workflow context 804 can be provided by agent context manager 120 of FIG. 1, for example. Workflow context 804 can include a variety of inputs, variables, and step results as objects which can be provided to enhanced response builder 122 of FIG. 1, as well as a status of the workflow as a string, for constructing enhanced response 802. Similarly, AI context 808 can be provided by agent context manager 120 of FIG. 1, and can include a plurality of strings defining instructions, constraints, success criteria, and allowed decisions, as well as an object defining the agent protocol to be followed. Enhanced response 802 can further include next path information 806, which can comprise a plurality of various next paths, each including strings to define possible decisions, triggering nodes, and explanations of the path to follow, as well as objects defining any pertinent metadata for each next path. Through the combination of these data sources 804-808, enhanced response 802 can be constructed to include all pertinent information about the workflow, the LLM agent, the histories of both, and the possible next steps that can be taken moving forward with the identified workflow.

Example Computer System

Figure 9:
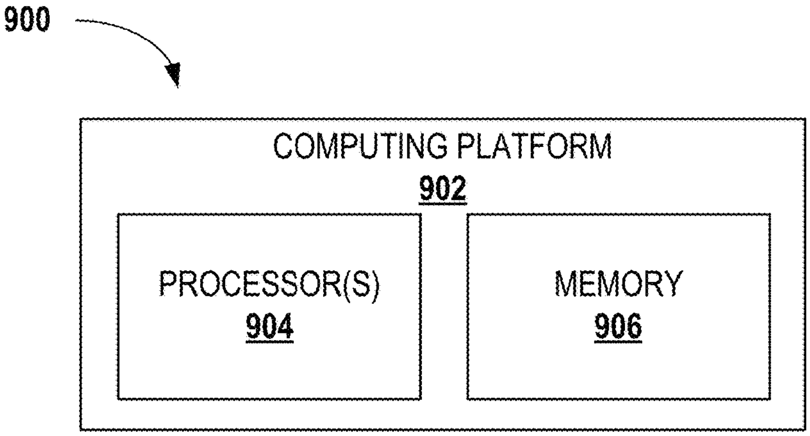
FIG. 9 is an example of a block diagram of a system for implementing the methods disclosed herein, according to one or more embodiments of the present disclosure.

FIG. 9 is an example of a block diagram of a system 900. System 900 can be implemented using one or more modules, shown in block form in the drawings. The one or more modules can be in software or hardware form, or a combination thereof. In some examples, system 900 can be implemented as machine readable instructions for execution on one or more computing platforms 902 (referred to as a computing platform herein), as shown in FIG. 9. The computing platform 902 can include one or more computing devices selected from, for example, a desktop computer, a server, a controller, a blade, a mobile phone, a tablet, a laptop, a personal digital assistant (PDA), and the like.

The computing platform 902 can include a processor 904 and a memory 906. By way of example, the memory 906 can be implemented, for example, as a non-transitory computer storage medium, such as volatile memory (e.g., random access memory), non-volatile memory (e.g., a hard disk drive, a solid-state drive, a flash memory, or the like), or a combination thereof. The processor 904 can be implemented, for example, as one or more processor cores. The memory 906 can store machine-readable instructions that can be retrieved and executed by the processor 904 to implement system 900. Each of the processor 904 and the memory 906 can be implemented on a similar or a different computing platform. The computing platform 902 can be implemented in a cloud computing environment (for example, as disclosed herein) and thus on a cloud infrastructure. In such a situation, features of the computing platform 902 can be representative of a single instance of hardware or multiple instances of hardware executing across the multiple of instances (e.g., distributed) of hardware (e.g., computers, routers, memory, processors, or a combination thereof). Alternatively, the computing platform 902 can be implemented on a single dedicated server or workstation.

Cloud computing is a model of service delivery for enabling convenient, on-demand net-work access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models (e.g., software as a service (Saas, platform as a service (PaaS), and/or infrastructure as a service (IaaS)) and at least four deployment models (e.g., private cloud, community cloud, public cloud, and/or hybrid cloud). A cloud computing environment can be service orient-ed with a focus on statelessness, low coupling, modularity, and semantic interoperability.

Figure 10:
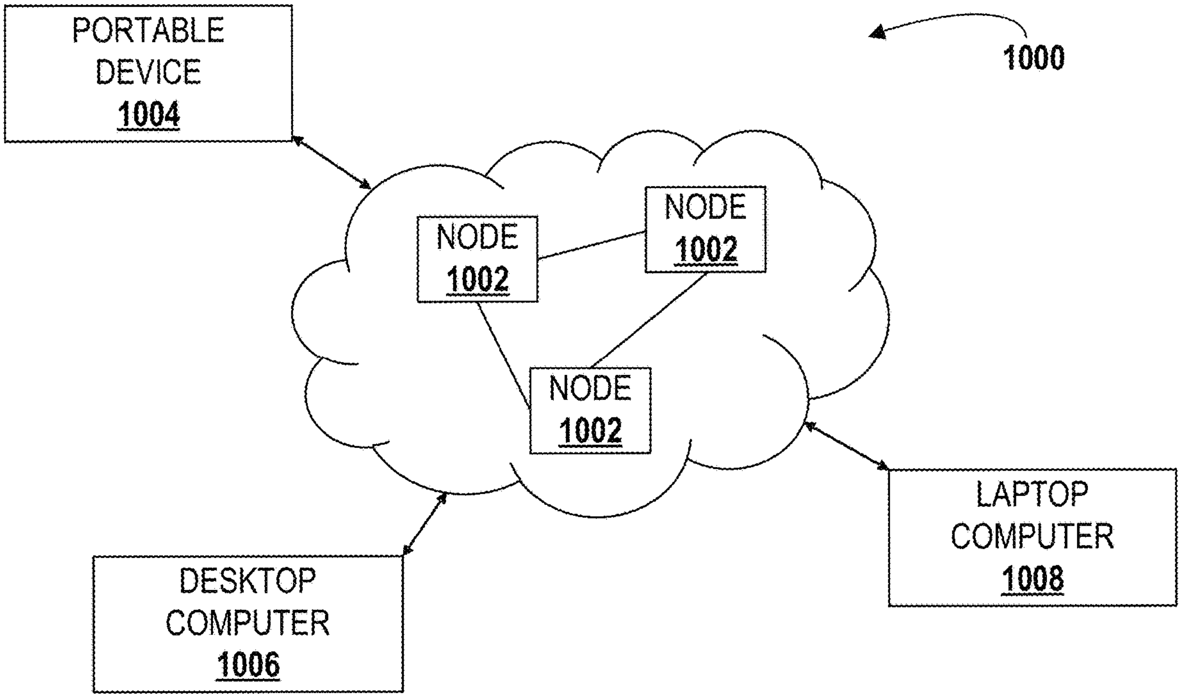
FIG. 10 is an example of a cloud computing environment that can be used for implementing one or more modules and/or systems, according to one or more embodiments of the present disclosure.

FIG. 10 is an example of a cloud computing environment 1000 that can be used for implementing one or more modules and/or systems in accordance with one or more examples, as disclosed herein. Thus, reference can be made to one or more examples of FIGS. 1-9 in the example of FIG. 10. As shown, cloud computing environment 1000 can include one or more cloud computing nodes 1002 with which local computing devices used by cloud consumers (or users), such as, for example, personal digital assistant (PDA), cellular, or portable device 1004, a desktop computer 1006, and/or a laptop computer 1008, can communicate. The computing nodes 1002 can communicate with one another. In some examples, the computing nodes 1002 can be grouped (not shown) physically or virtually, in one or more networks, such as Private, Community, Public, or Hybrid clouds, or a combination thereof. This allows the cloud computing environment 1000 to offer infrastructure, platforms and/or software as services for which a cloud consumer does not need to maintain resources on a local computing device. The devices 1004-1008, as shown in FIG. 10, are intended to be illustrative and that computing nodes 1002 and cloud computing environment 1000 can communicate with any type of computerized device over any type of network and/or network addressable connection (e.g., using a web browser). In some examples, the one or more computing nodes 1002 are used for implementing one or more examples disclosed herein relating to identity management services and workflows. Thus, in some examples, the one or more computing nodes can be used to implement modules, platforms, and/or systems, as disclosed herein.

In some examples, the cloud computing environment 1000 can provide one or more functional abstraction layers. It is to be understood that the cloud computing environment 1000 need not provide all of the one or more functional abstraction layers (and corresponding functions and/or components), as disclosed herein. For example, the cloud computing environment 1000 can provide a hardware and software layer that can include hardware and software components. Examples of hardware components include: mainframes; RISC (Reduced Instruction Set Computer) architecture based servers; servers; blade servers; storage devices; and networks and networking components. In some embodiments, software components include network application server software and database software.

In some examples, the cloud computing environment 1000 can provide a virtualization layer that provides an abstraction layer from which the following examples of virtual entities can be pro-vided: virtual servers; virtual storage; virtual networks, including virtual private networks; virtual applications and operating systems; and virtual clients. In some examples, the cloud computing environment 1000 can provide a management layer that can provide the functions described below. For example, the management layer can provide resource provisioning that can provide dynamic procurement of computing resources and other resources that are utilized to perform tasks within the cloud computing environment. The management layer can also provide metering and pricing to provide cost tracking as resources are utilized within the cloud computing environment 1000, and billing or invoicing for consumption of these resources. In one example, these re-sources can include application software licenses. Security provides identity verification for cloud consumers and tasks, as well as protection for data and other resources. The management layer can also provide a user portal that provides access to the cloud computing environment 1000 for consumers and system administrators. The management layer can also provide service level management, which can provide cloud computing resource allocation and management such that required service levels are met. Service Level Agreement (SLA) planning and fulfillment can also be provided to provide pre-arrangement for, and procurement of, cloud computing re-sources for which a future requirement is anticipated in accordance with an SLA.

Example System

Figure 11:
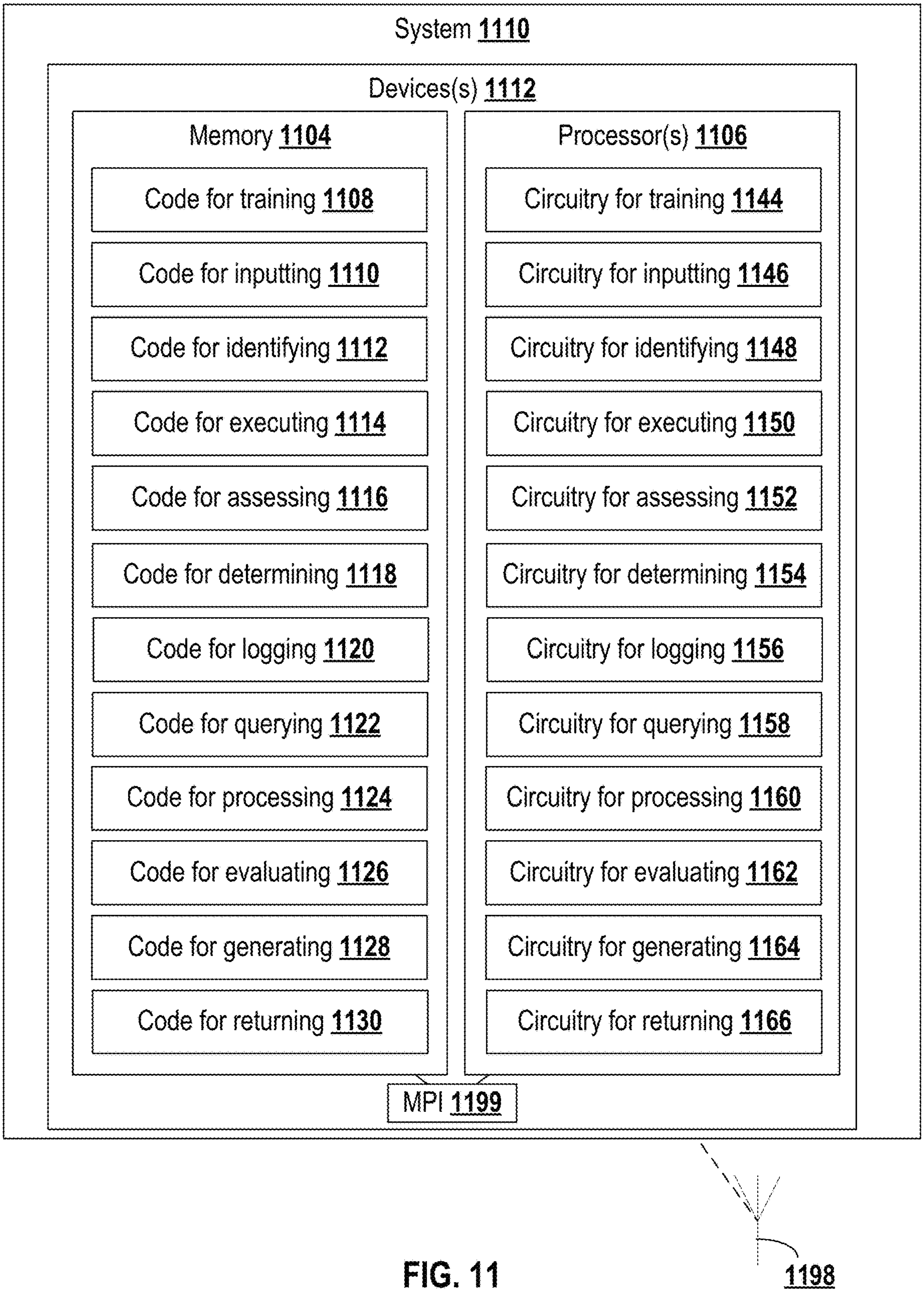
FIG. 11 illustrates a schematic diagram of an example system for implementing the methods disclosed herein, according to one or more embodiments of the present disclosure.

FIG. 11 illustrates a schematic diagram of an example system 1100. The system 1100 can be implemented as part of the utilization of a zero-shot AI workflow engine with LLM agents through a universal API gateway for autonomous execution of identity management system services, described with respect to FIGS. 1-8. Components of the system can be implemented at a single location or at multiple locations and can be a supervisory system or can be in communication with a supervisory system by way of a communication line. In at least one embodiment, the communication line can be a wireless communication line, a wired communication line, or both, though other types of communication line are contemplated.

The device(s) 1102 can include a CPU processing system, which can be configured to perform regularization procedures, such as those described herein with respect to FIG. 1-8, as performed by the system 1100. The CPU processing system of the device(s) 1102 can include one or more processors 1106 coupled to a computer readable medium/memory 1104, for example via a bus (not shown). The one or more processors 1106 and the computer readable medium/memory 1104 can communicate via a message passing interface (MPI) 1199. In certain embodiments the computer readable medium/memory 1104 is configured to store instructions (e.g., computer executable code) that when executed by the one or more processors 1106, cause the one or more processors to perform the methods 300, 400, or 500 described with respect to FIGS. 3-5, or any embodiment related to it. Reference to a single processor performing a function of system 1100 can include one or more processors performing that function of system 1100.

In the depicted example, computer-readable medium/memory 1104 stores code (e.g., executable instructions) 1108 for training, code 1110 for inputting, code 1112 for identifying, code 1114 for executing, code 1116 for assessing, code 1118 for determining, code 1120 for logging, code 1122 for querying, code 1124 for processing, code 1126 for evaluating, code 1128 for generating, and code 1130 for returning. Processing of code 1108-1130 can cause the system 1100 to perform the methods 300, 400, or 500 described with respect to FIGS. 3-5, or any embodiment related to it.

The one or more processors 1106 include circuitry configured to implement (e.g., execute) the code stored in the computer-readable medium/memory 1104, including circuitry 1144 for training, circuitry 1146 for inputting, circuitry 1148 for identifying, circuitry 1150 for executing, circuitry 1152 for assessing, circuitry 1154 for determining, circuitry 1156 for logging, circuitry 1158 for querying, circuitry 1160 for processing, circuitry 1162 for evaluating, circuitry 1164 for generating, and circuitry 1166 for returning. Processing with circuitry 1144-1166 can cause the system 1100 to perform the methods 300, 400, or 500 described with respect to FIGS. 3-5, or any embodiment related to it.

Various components of the system 1100 can provide means for performing the methods 300-500 described with respect to FIGS. 3-5, or any embodiment related to it.

The system 1100 can include or be substantially coupled to a communication component 1198. In the depicted example, the communication component 1198 is an antenna capable of communicating with controllers similar to system 1100 to perform the methods 300, 400, or 500 described with respect to FIGS. 3-5, or any embodiment related to it. In additional examples, the communication component 1198 can be a bus or a wired connection.

In further embodiments, processing can be distributed among one or more processors at the same or different locations over a network. Processing steps 302-312 in method 300, processing steps 402-414 in method 400, processing steps 502-512 in method 500, system 100 and its components (LLM agent 102, natural language processor 104, workflow engine 106, mermaid diagram generator 116, next path generator 118, agent context manager 120, enhanced response builder 122, diagram processor 124, and action selector 126), and system 200 and its components (universal authorization layer 202, connector construction engine 208, and logging engine 214) can be implemented on any type of computing device including, but not limited to, a laptop, desktop, tablet, workstation, mobile device or smartphone, kiosk, embedded system, or other computing device having at least one processor and a non-transitory computable readable memory. The computing device can include a browser, application, and operating system along with a user-interface depending upon a desired configuration. The computing device can have functionality performed at the same or different physical locations and by one or more processors located at the same or different locations. A computing device can also be coupled to one or more application programming interfaces (APIs) to perform or distribute embodiments of the functionality described herein. Computing functionality as described herein can also be implemented on a server, cluster of servers, web server, cloud-computing platform, and/or other remote service. A client/server architecture can also be implemented as would be apparent to a person skilled in the art given this description.

Example Embodiments

Embodiments disclosed herein include:

A. An agent-centric workflow system includes a workflow engine operable to receive a workflow identifier and return a machine-readable response including instructions and success criteria. The workflow engine includes a next path generator operable to identify a possible next step in an identified workflow, dependencies between nodes of the identified workflow, and a consequence of the possible next step using a configuration file that corresponds to an application programming interface (API) for the identified workflow, and an agent context manager operable to use the configuration file to provide a current state, instructions, constraints, and success criteria corresponding to the possible next step and operable to construct the machine-readable response. The system further includes a large language model (LLM) agent including a natural language processor and operable to receive the machine-readable response and execute the instructions under the constraints in a zero-shot execution, and a target system including one or more APIs through which the LLM agent communicates with an identity provider or policy decision point.

B. A computer-implemented method for performing a workflow in an agent-centric paradigm includes receiving a workflow identifier within a workflow engine to initiate an operation of a large language model (LLM) agent, generating instructions, constraints, and success criteria for execution by the LLM agent for a next possible step of an identified workflow corresponding to the workflow identifier, and executing, via the LLM agent, the instructions under the constraints for the next possible step through a universal authorization layer, the universal authorization layer performing normalization of access requests and enforcing identity policies. The method further includes assessing, via the LLM agent, whether the success criteria have been met for the next possible step of the identified workflow, and querying the workflow engine for a further possible step for the identified workflow based upon the success criteria and an assessed result thereof.

C. A vendor-agnostic identity integration system includes a large language model (LLM) agent including a natural language processor and operable to execute instructions for a specified workflow, a connector construction engine operable to construct a workflow-specific configuration file from API documentation, existing configuration files, or a combination thereof, and a workflow engine, implemented on at least one processor, operable to receive a workflow identifier corresponding to the specified workflow and return a machine-readable response constructed from the corresponding configuration file, the machine-readable response including instructions and success criteria for execution by the LLM agent. The system further includes a target system including one or more application programming interfaces (APIs) through which the LLM agent communicates with an identity provider or policy decision point via the universal authorization layer, and a logging engine operable to record operations of the LLM agent and workflow states of the specified workflow in a standardized audit format using an event taxonomy defining a set of standardized event types for workflow operations and states.

Each of embodiments A through C may have one or more of the following additional elements in any combination: Element 1: further comprising: a universal authorization layer operable to normalize access requests and enforce policies across a plurality of identity providers and/or policy decision points through the APIs. Element 2: wherein the workflow engine further comprises: an enhanced response builder providing a component-based builder pattern including a pluggable component architecture with an abstract interface to construct sub-portions of the machine-readable response. Element 3: further comprising: a connector construction engine operable to load YAML-based connector structures for an API and construct a new, workflow-specific configuration file including instructions, constraints, and success criteria for a corresponding workflow. Element 4: wherein the next path generator is further operable to assess satisfied dependencies of the nodes of the identified workflow and to output a set of nodes for safe parallel execution based upon state of each node and the satisfied dependencies. Element 5: further comprising: a logging engine operable to record operations of the LLM agent and workflow states of the identified workflow in a standardized audit format using an event taxonomy defining a set of standardized event types for workflow operations and states. Element 6: wherein the configuration file is a YAML configuration file, and wherein the YAML configuration file includes a plurality of command fragments able to be compiled to yield a protocol-agnostic command object that is executable as a standalone API call or insertable into a workflow. Element 7: further comprising: querying a current state and the next possible step of the identified workflow in response to initially receiving the workflow identifier. Element 8: further comprising: determining if a configuration file is available for the identified workflow, the configuration file including the instructions, constraints, and success criteria for the identified workflow and a corresponding application programming interface (API). Element 9: further comprising: parsing documentation for the corresponding API to extract instructions, constraints, states, and success criteria for a workflow in the corresponding API in response to a determination that the configuration file is unavailable; and generating a workflow-specific configuration file for use in the workflow engine via the documentation and a connector construction engine.

Element 10: further comprising: flattening a nested result hierarchy into a single-level data structure including top-level fields merged with inner and nested result objects in a deterministic transformation pipeline. Element 11: wherein the workflow-specific configuration file is a YAML configuration file. Element 12: wherein the workflow engine provides the instructions, constraints, and success criteria to the LLM agent in a JSON format converted from the YAML configuration file. Element 13: further comprising: logging, via a logging engine, the assessed result of the next possible step and a current state of the identified workflow in a standardized audit format using an event taxonomy defining a set of standardized event types for workflow operations and states based on LLM agent-generated responses. Element 14: the workflow engine comprising: a next path generator operable to identify a possible next step in the specified workflow, dependencies between nodes of the specified workflow, and a consequence of the possible next step using the workflow-specific configuration file; and an agent context manager operable to use the workflow-specific configuration file to provide a current state, instructions, constraints, and success criteria corresponding to the possible next step and operable to construct the machine-readable response. Element 15: wherein the workflow-specific configuration file is a YAML configuration file, and wherein the machine-readable response is provided in a JSON format, the machine readable response including instructions, intermediate checks, constraints, success criteria, and examples receivable by the LLM agent. Element 16: wherein the workflow engine further includes a mermaid diagram generator operable to construct one or more visual process representations of the specified workflow, and wherein the LLM agent includes a diagram processor providing the LLM agent with a native understanding of the visual process representation. Element 17: further comprising: a universal authorization layer operable to normalize access requests and enforce policies across a plurality of identity providers and policy decision points.

By way of non-limiting example, exemplary combinations applicable to A through C include: Element 2 with Element 3; Element 8 with Element 9; Element 9 with Element 10; Element 9 with Element 11; Element 11 with Element 12; and Element 14 with Element 15.

Additional Considerations

Embodiments of the present disclosure are described herein with reference to flowchart illustrations and/or block diagrams of methods, apparatus (systems), and computer program products accord-ing to embodiments of the disclosure. It will be understood that each block of the flowchart il-lustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable pro-gram instructions can also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such as the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products ac-cording to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that per-form the specified functions or acts or conduct combinations of special purpose hardware and computer instructions.

"Real-time" can refer to the capability of a system or process to respond to inputs or events within a strict period of time, such as immediately or within seconds or milliseconds. In computing and information technology, real-time systems can be designed to process data and provide outputs instantaneously or almost instantaneously, ensuring minimal latency.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" can indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. An agent-centric workflow system, comprising:

a workflow engine operable to receive a workflow identifier corresponding to an identified workflow and return a machine-readable response including instructions and success criteria, the workflow engine including:

a next path generator operable to identify a possible next step in the identified workflow, dependencies between nodes of the identified workflow, and a consequence of the possible next step using a configuration file that corresponds to an application programming interface (API) for the identified workflow, the configuration file including the instructions, constraints, and the success criteria for the identified workflow, and an agent context manager operable to use the configuration file to provide a current state, the instructions, the constraints, and the success criteria corresponding to the possible next step and operable to construct the machine-readable response;

a large language model (LLM) agent including a natural language processor and operable to receive the machine-readable response and execute the instructions under the constraints in a zero-shot execution; and a target system including one or more APIs through which the LLM agent communicates with an identity provider or policy decision point to perform an identity management workflow.

2. The system of claim 1, further comprising:

a universal authorization layer operable to normalize access requests and enforce policies across a plurality of identity providers and/or policy decision points through the APIs.

3. The system of claim 1, wherein the workflow engine further comprises:

an enhanced response builder providing a component-based builder pattern including a pluggable component architecture with an abstract interface to construct sub-portions of the machine-readable response.

4. The system of claim 3, further comprising:

a connector construction engine operable to load YAML-based connector structures for an API and construct a new, workflow-specific configuration file including instructions, constraints, and success criteria for a corresponding workflow.

5. The system of claim 1, wherein the next path generator is further operable to assess satisfied dependencies of the nodes of the identified workflow and to output a set of nodes for safe parallel execution based upon state of each node and the satisfied dependencies.

6. The system of claim 1, further comprising:

a logging engine operable to record operations of the LLM agent and workflow states of the identified workflow in a standardized audit format using an event taxonomy defining a set of standardized event types for workflow operations and states.

7. The system of claim 1, wherein the configuration file is a YAML configuration file, and wherein the YAML configuration file includes a plurality of command fragments able to be compiled to yield a protocol-agnostic command object that is executable as a standalone API call or insertable into a workflow.

8. A computer-implemented method for performing a workflow in an agent-centric paradigm, the method comprising:

receiving a workflow identifier corresponding to an identified workflow within a workflow engine to initiate an operation of a large language model (LLM) agent;

generating instructions, constraints, and success criteria for execution by the LLM agent for a next possible step of the identified workflow corresponding to the workflow identifier;

executing, via the LLM agent, the instructions under the constraints for the next possible step through a universal authorization layer, the universal authorization layer performing normalization of access requests and enforcing identity policies;

assessing, via the LLM agent and based on the success criteria generated for the next possible step, whether the success criteria have been met for the next possible step of the identified workflow; and querying the workflow engine for a further possible step for the identified workflow based upon the success criteria and an assessed result thereof, the workflow engine returning a further machine-readable response for the further possible step.

9. The computer-implemented method of claim 8, further comprising:

querying a current state and the next possible step of the identified workflow in response to initially receiving the workflow identifier.

10. The computer-implemented method of claim 8, further comprising:

determining if a configuration file is available for the identified workflow, the configuration file including the instructions, constraints, and success criteria for the identified workflow and a corresponding application programming interface (API).

11. The computer-implemented method of claim 10, further comprising:

parsing documentation for the corresponding API to extract instructions, constraints, states, and success criteria for a workflow in the corresponding API in response to a determination that the configuration file is unavailable; and generating a workflow-specific configuration file for use in the workflow engine via the documentation and a connector construction engine.

12. The computer-implemented method of claim 11, further comprising:

flattening a nested result hierarchy into a single-level data structure including top-level fields merged with inner and nested result objects in a deterministic transformation pipeline.

13. The computer-implemented method of claim 11, wherein the workflow-specific configuration file is a YAML configuration file.

14. The computer-implemented method of claim 13, wherein the workflow engine provides the instructions, constraints, and success criteria to the LLM agent in a JSON format converted from the YAML configuration file.

15. The computer-implemented method of claim 8, further comprising:

logging, via a logging engine, the assessed result of the next possible step and a current state of the identified workflow in a standardized audit format using an event taxonomy defining a set of standardized event types for workflow operations and states based on LLM agent-generated responses.

16. A vendor-agnostic identity integration system, comprising:

a large language model (LLM) agent including a natural language processor and operable to execute instructions for a specified workflow;

a connector construction engine operable to parse application programming interface (API) documentation to extract the instructions, constraints, and success criteria for a workflow in a corresponding API, and to construct a workflow-specific configuration file from API documentation, existing configuration files, or a combination thereof;

a workflow engine, implemented on at least one processor, operable to receive a workflow identifier corresponding to the specified workflow and return a machine-readable response constructed from the workflow-specific configuration file, the machine-readable response including the instructions and the success criteria for execution by the LLM agent;

a target system including one or more application programming interfaces (APIs) through which the LLM agent communicates with an identity provider or policy decision point via a universal authorization layer; and a logging engine operable to record operations of the LLM agent and workflow states of the specified workflow in a standardized audit format using an event taxonomy defining a set of standardized event types for workflow operations and states.

17. The system of claim 16, the workflow engine comprising:

a next path generator operable to identify a possible next step in the specified workflow, dependencies between nodes of the specified workflow, and a consequence of the possible next step using the workflow-specific configuration file; and an agent context manager operable to use the workflow-specific configuration file to provide a current state, instructions, constraints, and success criteria corresponding to the possible next step and operable to construct the machine-readable response.

18. The system of claim 17, wherein the workflow-specific configuration file is a YAML configuration file, and wherein the machine-readable response is provided in a JSON format, the machine readable response including instructions, intermediate checks, constraints, success criteria, and examples receivable by the LLM agent.

19. The system of claim 16, wherein the workflow engine further includes a mermaid diagram generator operable to construct one or more visual process representations of the specified workflow, and wherein the LLM agent includes a diagram processor providing the LLM agent with a native understanding of the visual process representation.

20. The system of claim 16, further comprising:

a universal authorization layer operable to normalize access requests and enforce policies across a plurality of identity providers and policy decision points.

* * * * *